(12) United States Patent
Otsuru

(10) Patent No.: US 11,745,957 B2
(45) Date of Patent: Sep. 5, 2023

(54) TRANSPORT DEVICE

(71) Applicants: Kabushiki Kaisha Toshiba, Minato-ku (JP); Toshiba Infrastructure Systems & Solutions Corporation, Kawasaki (JP)

(72) Inventor: Yoshihide Otsuru, Yokohama (JP)

(73) Assignees: Kabushiki Kaisha Toshiba, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 782 days.

(21) Appl. No.: 16/565,613

(22) Filed: Sep. 10, 2019

(65) Prior Publication Data
US 2020/0024084 A1 Jan. 23, 2020

Related U.S. Application Data

(63) Continuation of application No. PCT/JP2018/001454, filed on Jan. 18, 2018.

(30) Foreign Application Priority Data

Mar. 10, 2017 (JP) .................. 2017-046792

(51) Int. Cl.
*B65G 17/32* (2006.01)
*B65G 47/91* (2006.01)
(Continued)

(52) U.S. Cl.
CPC ........... *B65G 47/917* (2013.01); *B25J 13/08* (2013.01); *B25J 13/081* (2013.01); *B25J 13/087* (2013.01);
(Continued)

(58) Field of Classification Search
None
See application file for complete search history.

(56) References Cited

U.S. PATENT DOCUMENTS 5,324,087 A * 6/1994 Shimose ................ B65G 47/91
294/185
9,503,704 B2 * 11/2016 Ando ..................... B25J 9/1697
(Continued)

FOREIGN PATENT DOCUMENTS

EP 1 385 122 A1 1/2004
EP 1 862 270 A2 12/2007
(Continued)

OTHER PUBLICATIONS

Panial Supplementary European Search Report dated April 17, 2020 in corresponding European Patent Application No. 187648605, 14 pages.
(Continued)

*Primary Examiner* — Kavel Singh
(74) *Attorney, Agent, or Firm* — Maier & Maier, PLLC

(57) ABSTRACT

A transport device has a position detection portion, a holding portion attached to an arm, a driving portion to drive the holding portion and the arm, and a control portion. A control portion controls the position detection portion and the driving portion to perform, as one cycle, a procedure to detect a position of a parcel, select parcels based on a predetermined condition, and set priority for the selected parcels, and a procedure to refer to a result of the detection, and cause the holding portion to take out one or more parcels from the accumulation portion in accordance with the priority to transport the parcels to a predetermined location, and excludes, from parcels to be taken out, a second parcel that
(Continued)

is present within a predetermined distance from a first parcel and has priority lower than the priority of the first parcel, during the one cycle.

15 Claims, 11 Drawing Sheets

(51) Int. Cl.
| | |
|---|---|
| B65G 57/04 | (2006.01) |
| B65G 59/04 | (2006.01) |
| B65G 61/00 | (2006.01) |
| B25J 13/08 | (2006.01) |
| B25J 15/00 | (2006.01) |
| B65G 49/06 | (2006.01) |
| B65G 57/00 | (2006.01) |
| B65G 57/03 | (2006.01) |
| B65G 59/00 | (2006.01) |
| B65G 63/00 | (2006.01) |
| B65G 63/02 | (2006.01) |
| B65G 65/00 | (2006.01) |
| B25J 15/06 | (2006.01) |

(52) U.S. Cl.
CPC ........ *B25J 15/0625* (2013.01); *B65G 17/323* (2013.01); *B65G 49/061* (2013.01); *B65G 49/067* (2013.01); *B65G 57/00* (2013.01); *B65G 57/03* (2013.01); *B65G 57/04* (2013.01); *B65G 59/00* (2013.01); *B65G 59/04* (2013.01); *B65G 61/00* (2013.01); *B65G 63/00* (2013.01); *B65G 63/002* (2013.01); *B65G 63/02* (2013.01); *B65G 63/022* (2013.01); *B65G 65/00* (2013.01); *B65G 65/005* (2013.01); *B65G 2201/0285* (2013.01); *B65G 2203/02* (2013.01); *B65G 2203/0208* (2013.01); *B65G 2203/0225* (2013.01); *B65G 2203/0233* (2013.01); *B65G 2203/0266* (2013.01); *B65G 2203/0283* (2013.01); *B65G 2203/042* (2013.01); *B65G 2209/04* (2013.01); *G05B 2219/39* (2013.01)

(56) References Cited

U.S. PATENT DOCUMENTS

| | | | | |
|---|---|---|---|---|
| 9,757,858 | B2* | 9/2017 | Eto | ........................ B25J 9/1612 |
| 2004/0019405 | A1 | 1/2004 | Ban et al. | |
| 2005/0226711 | A1 | 10/2005 | Schnoor et al. | |
| 2006/0226711 | A1* | 10/2006 | Eiring | .................. H05K 1/0266 |
| | | | | 340/9.1 |
| 2007/0274812 | A1 | 11/2007 | Ban et al. | |
| 2013/0238124 | A1 | 9/2013 | Suzuki et al. | |
| 2014/0234066 | A1* | 8/2014 | Mathi | .................. B65G 1/1376 |
| | | | | 414/751.1 |
| 2015/0321354 | A1 | 11/2015 | Nishihara | |
| 2016/0207195 | A1 | 7/2016 | Eto et al. | |
| 2017/0057092 | A1 | 3/2017 | Ito | |

FOREIGN PATENT DOCUMENTS

| | | |
|---|---|---|
| JP | 2000-304509 A | 11/2000 |
| JP | 2010-082782 A | 4/2010 |
| JP | 2013-119121 A | 6/2013 |
| JP | 2013-169640 A | 9/2013 |
| JP | 2015-213973 A | 12/2015 |
| JP | 2016-132521 A | 7/2016 |

OTHER PUBLICATIONS

International Search Report dated Mar. 20, 2018 in PCT/JP2018/001454 filed on Jan. 18, 2018.

* cited by examiner (1) Capture images/detect the position of the parcel (2) Move the holding portion to the position of the parcel (3) Lower the holding portion toward the position of the parcel (4) Lower the pressure within the pads to suction the parcel

TRANSPORT DEVICE

CROSS-REFERENCE TO RELATED APPLICATION(S)

This application is based upon and claims the benefit of priority from Japanese Patent Application No. 2017-046792 filed Mar. 10, 2017, the entire contents of which are incorporated herein by reference. This application is a continuation application of International Application No. PCT/JP2018/001454 filed on Jan. 18, 2018.

FIELD

Embodiments of the present invention relate to a transport device.

BACKGROUND

Conventionally, transport devices with a robot arm are known that take out parcels accumulated in a container and transport the parcels to a target location, e.g. onto a belt conveyor or the like, in a distribution center or the like. There are cases where conventional transport devices cannot accurately take out parcels from the container.

DESCRIPTION OF EMBODIMENTS

A transport device according to an embodiment has a position detection portion, a holding portion, a driving portion, and a control portion. The position detection portion includes a sensor provided above an accumulation portion for parcels, and detects a position of a parcel. The holding portion is attached to an arm and holds a parcel. A driving portion drives the holding portion and the arm. A control portion controls the position detection portion and the driving portion to perform, as one cycle, a procedure to detect a position of a parcel using the position detection portion, select parcels based on a predetermined condition, and set priority for the selected parcels, and a procedure to refer to a result of the detection performed by the position detection portion, and cause the holding portion to take out one or more parcels from the accumulation portion in accordance with the priority to transport the parcels to a predetermined location, and excludes, from parcels to be taken out, a second parcel that is present within a predetermined distance from a first parcel and has priority lower than the priority of the first parcel, during the one cycle.

A transport device according to an embodiment will be described below with reference to the drawings. The transport device is a device that is installed in a distribution center or the like to automatically take out parcels accumulated in a container or the like and transport the parcels to a predetermined location, e.g. onto a belt conveyor. Hereinafter, the drawings and descriptions will be given using an XYZ coordinate system as needed.

Configuration

Figure 1:
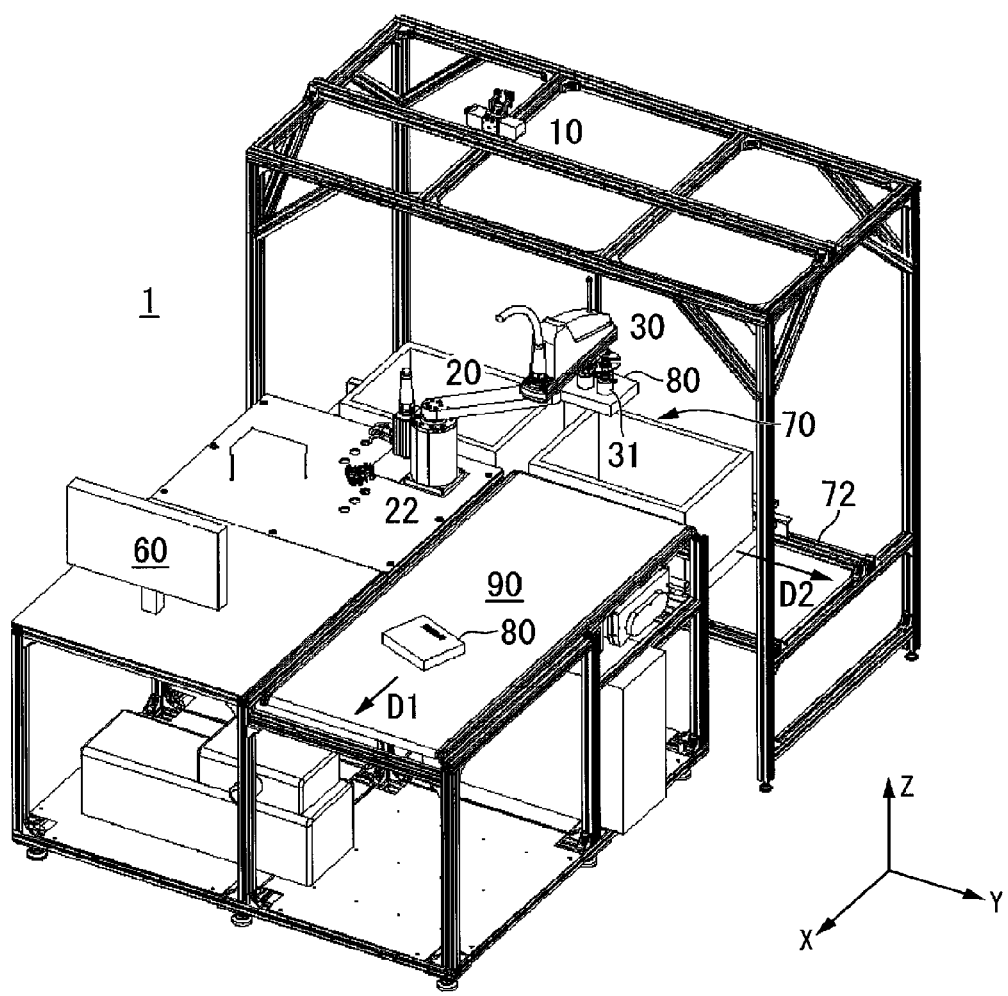
FIG. 1 is a perspective view illustrating an external appearance of a transport device 1 according to an embodiment.

FIG. 1 is a perspective view illustrating an external appearance of a transport device 1 according to an embodiment. For example, the transport device 1 includes a measurement unit 10, a robot arm 20 and an arm driving portion 22 for driving the robot arm 20, a holding portion 30, and a monitor 60.

The measurement unit 10 includes, for example, a camera for capturing, from above, an image of a parcel 80 that has been accommodated (accumulated) in a container 70, and a three-dimensional camera capable of measuring the distance to the parcel 80.

The three-dimensional camera generates a range image whose imaging plane is associated with the distance from the three-dimensional camera. The camera of the measurement unit 10 includes an imaging sensor.

The robot arm 20 is driven to rotate in the horizontal direction by the arm driving portion 22, and is also driven in the vertical direction. The holding portion 30 is attached to a leading end of the robot arm 20. The holding portion 30 includes a plurality of suction pads 31 (only one of which is denoted by the reference numeral in FIG. 1). Each of the suction pads 31 has a leading end portion that is cylindrical and has a bellows shape, for example, and the inside of the suction pads 31 is in communication with a later-described negative pressure generation mechanism. The leading end portion contracts as a result of each suction pad 31 being pressed against a parcel 80, and the suction pad 31 suctions the parcel 80 due to the negative pressure within the suction pad 31, and can thus lift the parcel 80.

Operations of the robot arm 20 and the holding portion 30 are controlled by a later-described controller 50. The robot arm 20 and the holding portion 30 lifts a parcel 80 from the container 70 due to the robot arm 20 being driven upward, and transports the parcel 80 to be above a belt conveyor 90 due to the robot arm 20 being driven to rotate. Then, the parcel 80 is placed onto the belt conveyor 90 due to the negative pressure within the suction pads 31 being canceled. The parcel 80 is carried away in a direction D1 in FIG. 1 by the belt conveyor 90. Note that the container 70 is transported, as appropriate, in a direction D2 in FIG. 1 by a rail 72.

The monitor 60 is visually checked by an operator of the transport device 1. The monitor 60 is, for example, a display device such as an LCD (Liquid Crystal Display), a CRT display, or an organic EL (Electroluminescence) display.

Figure 2:
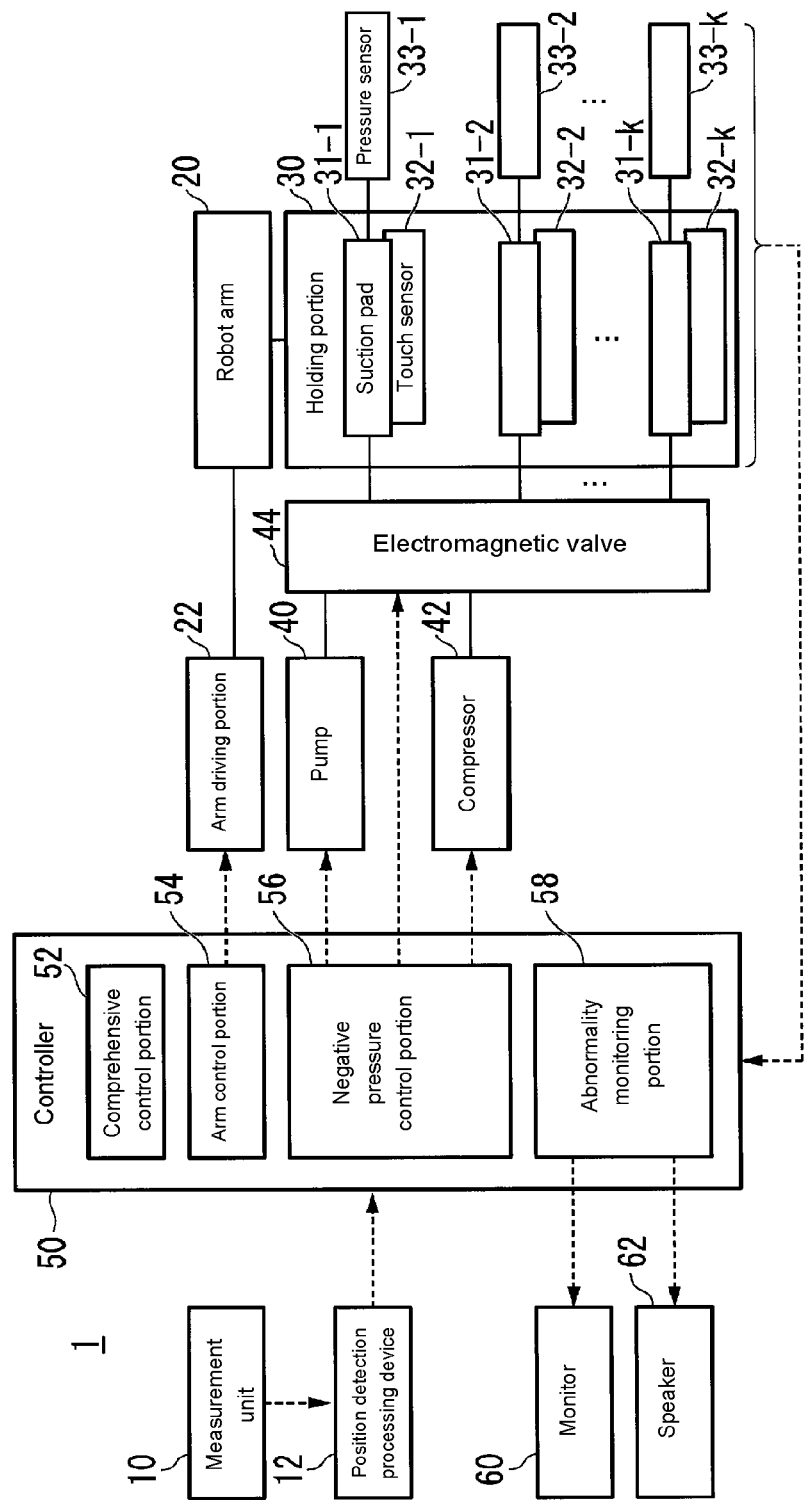
FIG. 2 is a functional block diagram of the transport device 1.

FIG. 2 is a functional block diagram of the transport device 1. The same constituent elements as those in FIG. 1 are assigned the same reference numerals, and descriptions thereof are omitted as appropriate.

An image and a range image generated by the measurement unit 10 are input to a position detection processing device 12. The position detection processing device 12 is a microcomputer that includes a processor such as a CPU (Central Processing Unit) or a GPU (Graphics Processing Unit). The position detection processing device 12 detects the area and position of a parcel 80 in the container 70 based on the image and the range image. This is a known art, and a description thereof is omitted accordingly. The processing results of the position detection processing device 12 serve as information that is three-dimensional spatial model information to which information indicating the area of each one parcel 80 is added, for example, and are output to the controller 50. Note that the position detection processing device 12 may also be integrated with the controller 50.

The holding portion 30 attached to the leading end of the robot arm 20 includes a plurality of suction pads 31-1, 31-2, ..., and 31-$k$. Touch sensors 32-1, 32-2, ..., and 32-$k$ are attached to the suction pads 31-1, 31-2, ..., and 31-$k$, respectively. In the following description, the numerals following the hyphen and indicating the corresponding suction pad may be omitted. Each of the touch sensors 32 outputs, to the controller 50, a signal indicating that the corresponding suction pad 31 has touched a parcel 80 if the bellows structure at the leading end portion of the suction pad 31 has contracted substantially by half.

Pressure sensors 33-1, 33-2, ..., and 33-$k$ for detecting the pressure within the suction pads 31 are provided in correspondence with the suction pads 31-1, 31-2, ..., 31-$k$, respectively. Each of the pressure sensors 33 outputs a signal indicating a detected pressure to the controller 50. The negative pressure generation mechanism includes a pump 40 for generating a negative pressure, a compressor 42 used to cancel the negative pressure, an electromagnetic valve 44, and a negative pressure hose 46 (described later). Each of the suction pads 31-1, 31-2, ..., and 31-$k$ enters a state where the inside thereof is in communication with either the pump 40 or the compressor 42 via the electromagnetic valve 44 (and each of the suction pads 31 may also enter a state where the inside thereof is not in communication with either the pump 40 or the compressor 42).

The controller 50 is a microcomputer that includes a processor such as a CPU or a GPU. The controller 50 includes, as its functional portions, a comprehensive control portion 52, an arm control portion 54, a negative pressure control portion 56, and an abnormality monitoring portion 58, for example. These functional portions are realized as a result of the processor such as a CPU executing a program, for example. Some or all of these functional portions may be realized by hardware such as an LSI (Large Scale Integration), an ASIC (Application Specific Integrated Circuit), or an FPGA (Field-Programmable Gate Array), or may be realized through cooperation between software and hardware.

The comprehensive control portion 52 controls the arm control portion 54 and the negative pressure control portion 56 in accordance with a predetermined rule. The arm control portion 54 determines the amount of control to be given to the arm driving portion 22, in accordance with an instruction from the comprehensive control portion 52. The negative pressure control portion 56 controls the pump 40, the compressor 42, and the electromagnetic valve 44 in accordance with an instruction from the comprehensive control portion 52 to cause the suction portions 31 to enter a state of being able to suction a parcel 80 and to detach the parcel 80 therefrom. The abnormality monitoring portion 58 monitors whether or not an abnormality that is difficult to automatically fix has occurred in the transport device 1, and if the abnormality monitoring portion 58 determines that an abnormality has occurred, the abnormality monitoring portion 58 causes one of or both the monitor 60 and a speaker 62 to output information indicating that an abnormality has occurred.

Of the above-described configurations, a combination of the measurement unit 10 and the position detection processing device 12 is an example of a position detection portion, a combination of the arm driving portion 22 and the electromagnetic valve 44 is an example of a driving portion, the controller 50 is an example of a control portion, the monitor 60 and the speaker 62 are examples of an output portion, the container 70 is an example of an accumulation portion, and the belt conveyor 90 is an example of a predetermined location.

Processing Performed by Comprehensive Control Portion

Processing performed by the comprehensive control portion 52 will be described below. First, in a general flow, a one-cycle operation includes: (A) processing to detect the positions of parcels in the container 70 performed by the measurement unit 10 and the position detection processing device 12; and (B) an operation to take out n parcels 80 from the container 70 based on the position detection results, and the comprehensive control portion 52 controls devices to be controlled to repeatedly perform the one-cycle operation until all parcels 80 are taken out from the container 70. n is an integer that is 1 or greater. The devices to be controlled include the measurement unit 10, the position detection processing device 12, the arm driving portion 22, and the electromagnetic valve 44, for example. If it is detected during the position detection processing that no parcel 80 is present in the container 70, processing for this container 70 ends.

Figure 3:
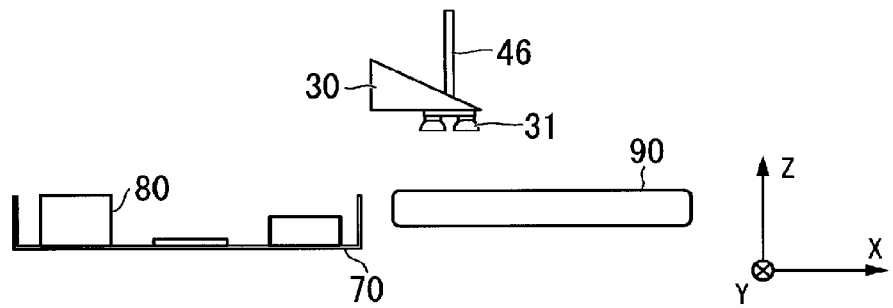
FIG. 3 schematically illustrates general operations of the transport device 1.
Figure 3:
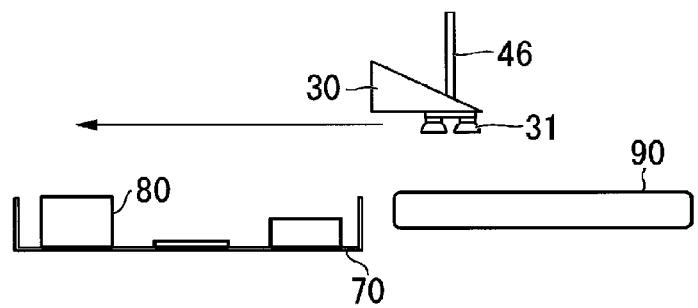
Figure 3:
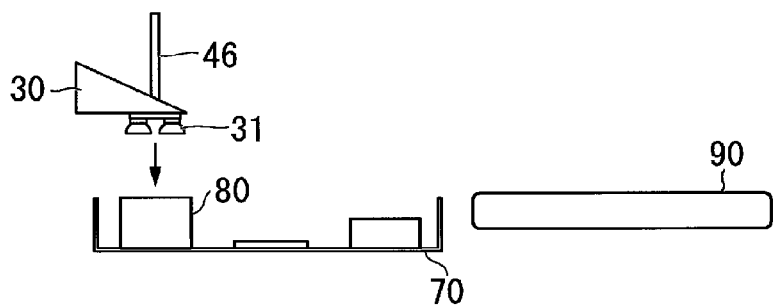
Figure 3:
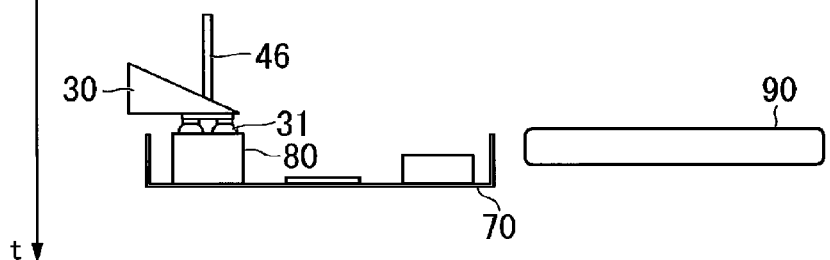
Figure 4:
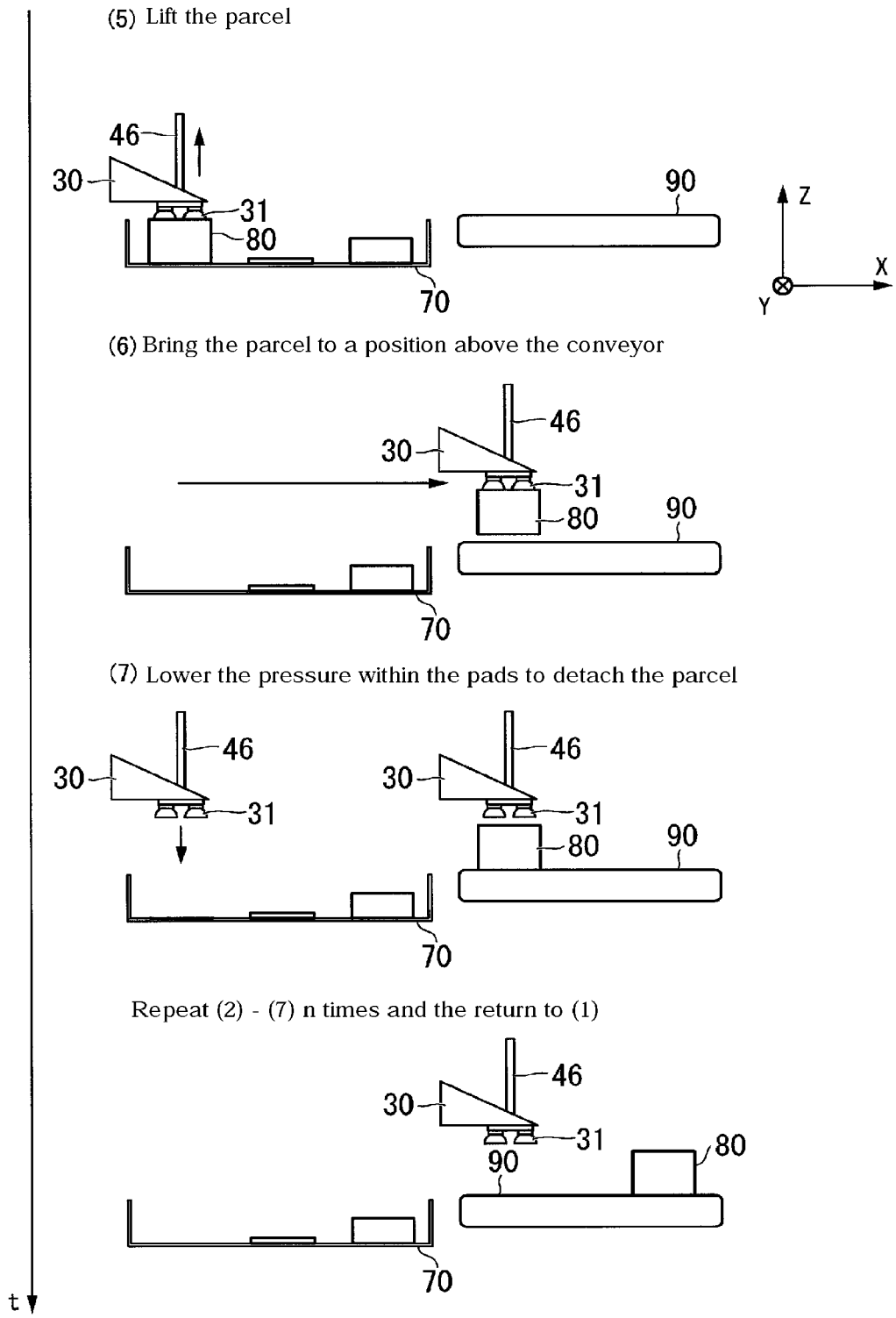
FIG. 4 schematically illustrates general operations of the transport device 1.

FIGS. 3 and 4 schematically illustrate general operations of the transport device 1. These diagrams omit the measurement unit 10 and the robot arm 20, and show the negative pressure hose 46. The negative pressure hose 46 may be provided for each of the suction pads 31, or may be one integrated hose. In the former case, the pressure sensors 33 may detect the pressure within the respective negative pressure hoses 46, in place of the pressure within the suction pads 31.

(1) Initially, the measurement unit 10 captures an image and a range image, and the position detection processing device 20 detects the positions of parcels. The controller 50 selects n parcels 80 in accordance with a predetermined condition, and also sets priority (order) for the selected parcels. The details of the predetermined condition will be described later.

(2) Next, the controller 50 moves the robot arm 20 to bring the holding portion 30 to a position above a parcel 80. (3) The controller 50 moves the robot arm 20 to lower the holding portion 30 toward the parcel 80. (4) After checking that the suction pads 31 have touched the parcel 80, the controller 50 controls the arm driving portion 22 and the electromagnetic valve 44 to lower the pressure within the suction pads 31 to suction the parcel 80. At this time, in (2), the controller 50 selects a parcel 80 with the highest priority out of the parcels 80 remaining after n parcels 80 have been selected in (1).

(5) Next, the controller 50 moves the robot arm 20 to lift the parcel 80 held by the holding portion 30. (6) The controller 50 moves the robot arm 20 to bring the parcel 80 held by the holding portion 30 to be above the belt conveyor 90. (7) The controller 50 controls the arm driving portion 22 and the electromagnetic valve 44 to lower the pressure within the suction pads 31 to detach (release) the parcel 80 therefrom. After (2) to (7) have been repeated n times, the operation returns to (1).

Next, descriptions will be given, in order, of various functions realized by the comprehensive control portion 52 and the abnormality monitoring portion 58 in the general flow described with reference to FIGS. 3 and 4. The transport device 1 has some or all of the functions 1 to 4 described below.

Function 1

Figure 5:
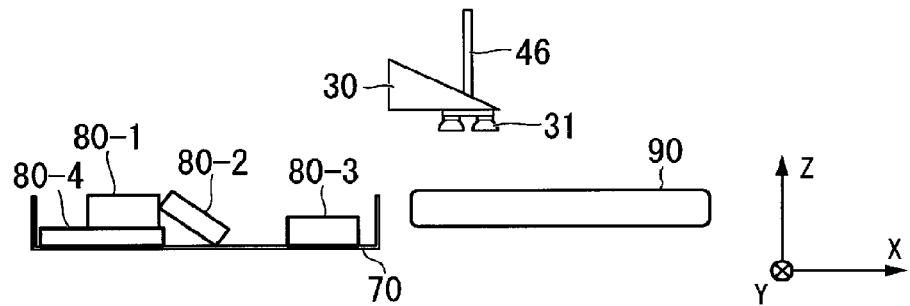
FIG. 5 is a diagram for illustrating a function 1.
Figure 6:
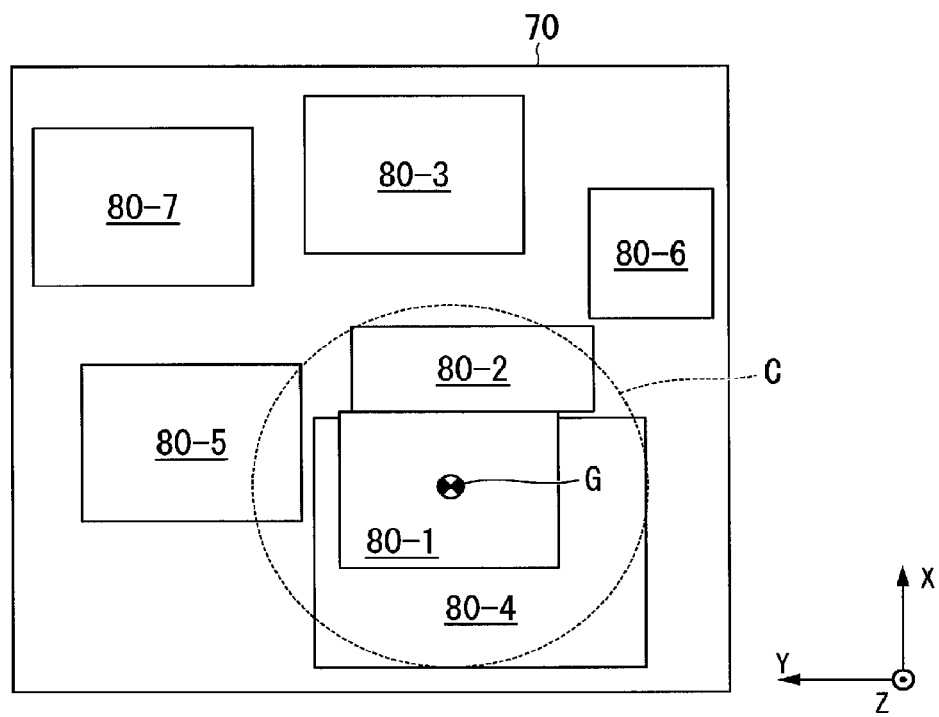
FIG. 6 is a diagram for illustrating the function 1.

FIGS. 5 and 6 are diagrams for illustrating the function 1. In a situation shown in FIG. 5, if three or more remaining parcels 80 are scheduled to be taken out, the comprehensive control portion 52 controls the devices to first take out the parcel 80-1, then take out the parcel 80-2, and then take out the parcel 80-3. However, the parcel 80-2 is in a state of leaning on the parcel 80-1, it is therefore highly likely that the position of the parcel 80-2 will change if the parcel 80-1 is taken out.

As described with reference to FIGS. 3 and 4, parcel position detection using the measurement unit 10 and the position detection processing device 20 is not performed while n parcels 80 are being taken out. The reason is as follows. Since an image of the parcels 80 is captured from above, the holding portion 30 needs to be withdrawn from above the container 70 to perform parcel position detection. For this reason, if parcel position detection is performed every time a parcel 80 is taken out, the operation time will be prolonged.

To reduce this problem, during the one-cycle operation, the comprehensive control portion 52 excludes, from n parcels 80 to be taken out, a second parcel 80 that is present within a predetermined distance from a first parcel 80 and has priority lower than the priority of the first parcel.

FIG. 6 shows the parcels 80 in the container 70 as viewed from above. Here, a description will be given of the predetermined condition (selection condition) and the like for, for example, selecting n parcels 80. For example, the comprehensive control portion 52 selects n parcels 80 that do not overlap each other as viewed from above, from parcels 80 whose upper end position is higher, and gives priority in the order from the parcels 80 whose upper end position is higher. The upper end refers to the position of each parcel 80 that is highest. As an example, the comprehensive control portion 52 determines that a parcel 80 does not overlap any other parcels as viewed from above, if an outline of that parcel 80 can be regarded as having a shape such as a rectangle, a circle, or an ellipse, and a portion or the entirety of any other parcels 80 located higher than the parcel 80 is not included in that outline. On the other hand, the comprehensive control portion 52 determines that a parcel 80 overlaps other parcels as viewed from above, if a portion or the entirety of other parcels 80 located higher than the parcel 80 is included in the outline thereof. In the example in FIG. 6, a parcel 80-1, which is located higher than a parcel 80-4, is included in the outline of the parcel 80-4, and accordingly, the parcel 80-4 is not to be selected as one of n parcels. Meanwhile, as for a parcel 80-2, even if the parcel 80-1 is located at a higher position, a portion of the parcel 80-1 is not included in the outline of the parcel 80-2, and accordingly, there is a possibility that the parcel 80-2 will be selected as one of the n parcels.

It is assumed that n parcels 80 have been selected as described above, and the highest priority is given to the parcel 80-1. In this case, for example, the comprehensive control portion 52 supposes a virtual circle C with its center being the centroid G of the parcel 80-1 (which is the geometric centroid of the region occupied by the parcel 80-1 as viewed from above, and may differ from the true centroid in some cases), for example, and excludes parcels 80 that overlap, at least partially, the virtual circle C (exclusion condition). The comprehensive control portion 52 excludes parcels 80 that overlap, at least partially, the virtual circle C from the parcels 80 to be taken out in the current cycle, even if these parcels 80 have been selected as the n parcels.

In the example in FIG. 6, the parcels 80-2 and 80-5 are excluded based on their relationship with the parcel 80-1, and the parcels 80-3, 80-6, and 80-7 are not excluded. The comprehensive control portion 52 may perform this determination when one-cycle processing is started, or may perform the same determination after some parcels 80 have actually been taken out, while dealing with the parcels 80 that have already been taken out as high-priority parcels 80.

The radius of the virtual circle C is preferably determined based on the largest size of parcels 80 to be dealt with by the transport device 1. For example, the radius of the virtual circle C is set to a distance that is slightly longer than the length from the centroid of a parcel 80 of the largest size, of the parcels 80 to be dealt with by the transport device 1, to an apex of that parcel 80.

With the function 1, the transport device 1 excludes, from parcels to be taken out, parcels 80 whose position is highly likely to change due to another parcel 80 being taken out, and can thus perform a take-out operation in a state where the positions of the parcels 80 are highly probable, without performing parcel position detection every time a parcel is taken out. As a result, the transport device 1 can accurately take out parcels 80 while realizing a high-speed operation.

Note that the function 1 can also be applied to a device that transports parcels 80 using a technique other than suction (e.g. in a mode of holding a parcel using a plurality of claw portions).

Function 2

Figure 7:
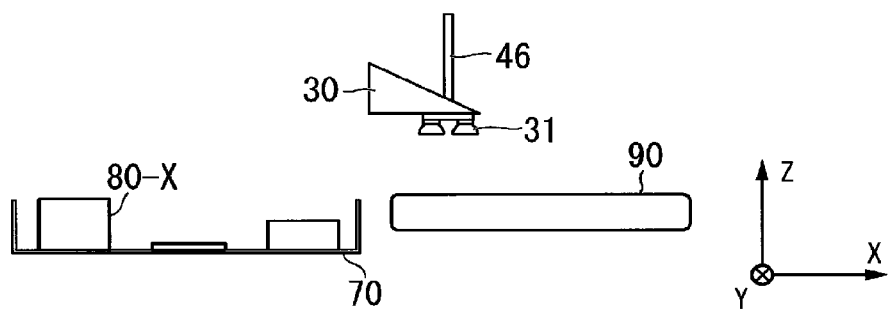
FIG. 7 is a diagram for illustrating a function 2.

FIG. 7 is a diagram for illustrating the function 2. A package of a parcel 80-X is made of a metal mesh or the like, and the parcel 80-X is a parcel that may not be able to be suctioned by the suction pads 31. In addition, parcels that are packaged with a wrinkled vinyl member may also not be able to be suctioned by the suction pads 31.

To deal with these parcels, the abnormality monitoring portion 58 performs error processing if the pressure detected by the pressure sensors 33 does not become smaller than a threshold in a predetermined time after it is detected by the contact sensors 32 that the suction pads 31, which are leading end portions of the holding portion 30, have touched a parcel. The error processing is, for example, processing to stop operations of the arm driving portion 22, the pump 40, the compressor 42, the electromagnetic valve 44, and the like, and display, on the monitor 60, an image indicating that a parcel 80 that cannot be taken out by the transport device 1 is mixed in the container 70, and/or cause the speaker 62 to output sound. As a result, the operator of the transport device 1 can manually take out this parcel 80 from the container 70 and bring the parcel 80 onto the belt conveyor 90.

Here, a plurality of touch sensors 32 and pressure sensors 33 are provided, but the aforementioned conditional determination may be set in any way. For example, the aforementioned condition may be a condition: "if, after a touch has been detected by at least one touch sensor 32, the pressure detected by at least one pressure sensor 33 does not become smaller than a threshold in a predetermined time", or may be a condition: "if, after a touch has been detected by at least one touch sensor 32, the pressures detected by all of the pressure sensors 33 do not become smaller than a threshold in a predetermined time", or may be a condition: "if, after a touch has been detected by all of the touch sensors 32, the pressure detected by at least one pressure sensor 33 does not become smaller than a threshold in a predetermined time", or may be a condition: "if, after a touch has been detected by all of the touch sensors 32, the pressures detected by all of the pressure sensors 33 do not become smaller than a threshold in a predetermined time".

With the function 2, the transport device 1 can perform the error processing to notify the operator, for example, if a parcel 80 that may not be able to be suctioned by the suction pads 31 is present. As a result, the transport device 1 can smoothly continue the operations.

Function 3

Figure 8:
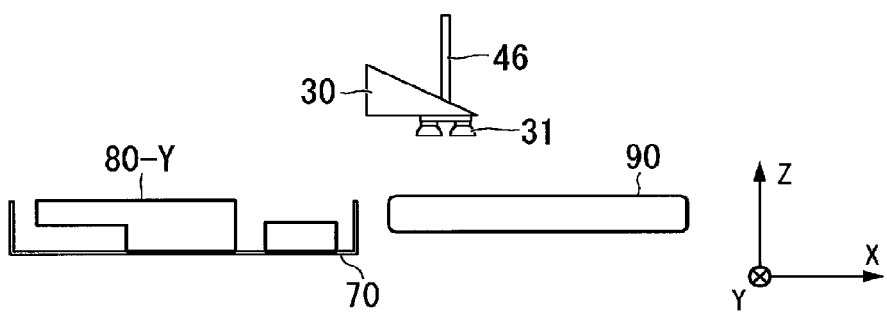
FIG. 8 is a diagram for illustrating a function 3.
Figure 9:
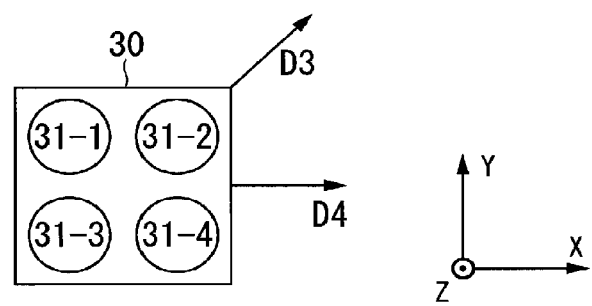
FIG. 9 is a diagram for illustrating the function 3.

FIGS. 8 and 9 are diagrams for illustrating the function 3. A parcel 80-Y is a parcel whose geometric centroid as viewed from above differs from its true centroid. Here, the comprehensive control portion 52 brings the holding portion 30 close to a parcel 80 with the center portion of the holding portion 30 in the XY direction aligned with the geometric centroid of the parcel as viewed from above. For this reason, in the case of a parcel such as the parcel 80-Y, the suction pads 31 will touch the parcel with a position out of the true centroid thereof as a center.

To address this, if, after the holding portion 30 has lifted a parcel 80, the parcel 80 unintentionally falls from the holding portion 30 during a one-cycle operation, the comprehensive control portion 52 refers to the results of detection performed by the pressure sensors 33, and controls the arm driving portion 22 and the electromagnetic valve 44 to move the holding portion 30 toward a suction pad 31 within which the pressure has increased early (i.e. a suction pad 31 that has been detached from the parcel 80) and cause the holding portion 30 to again lift the parcel 80.

FIG. 9 is a perspective view of the holding portion 30 as viewed from above. Here, the number n of suction pads 31 is four. In the example in FIG. 9, if the pressure detected by the pressure sensor 33-2 has increased to a value greater than or equal to a reference value earliest, it is inferred that the suction pad 31-2 has been detached from the parcel 80 earliest. In this case, it is estimated that the true centroid of the parcel 80 exists on the suction pad 31-2, and thus, the comprehensive control portion 52 controls the arm driving portion 22 and the electromagnetic valve 44 to move the holding portion 30 in a direction D3 by a fixed amount and cause the holding portion 30 to again lift the parcel 80. However, if the pressure detected by the pressure sensor 33-4 has increased to a value greater than or equal to the reference value in a predetermined time after the timing at which the pressure detected by the pressure sensor 33-2 increased to a value greater than or equal to the reference value, it is estimated that the true centroid of the parcel 80 exists on a side between the suction pads 31-2 and 31-4, and accordingly, the comprehensive control portion 52 may move the holding portion 30 in a direction D4 by a fixed amount. Thus, the moving direction may be finely determined based on the difference in the timing at which the pressure detected by each pressure sensor 33 increases.

Due to the function 3, if a parcel 80 falls due to the position to which the holding portion 30 is brought close shifting from the true centroid of the parcel 80, the transport device 1 can bring the holding portion 30 close to the parcel 80 in a direction in which the centroid thereof is estimated to exist, and again perform an operation to take out the parcel 80. As a result, the transport device 1 can reduce the possibility that a situation where a parcel 80 cannot be taken out occurs.

Function 4

Figure 10:
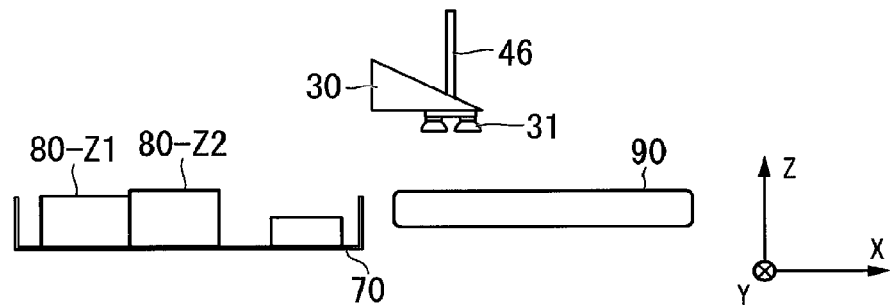
FIG. 10 is a diagram for illustrating a function 4.
Figure 11:
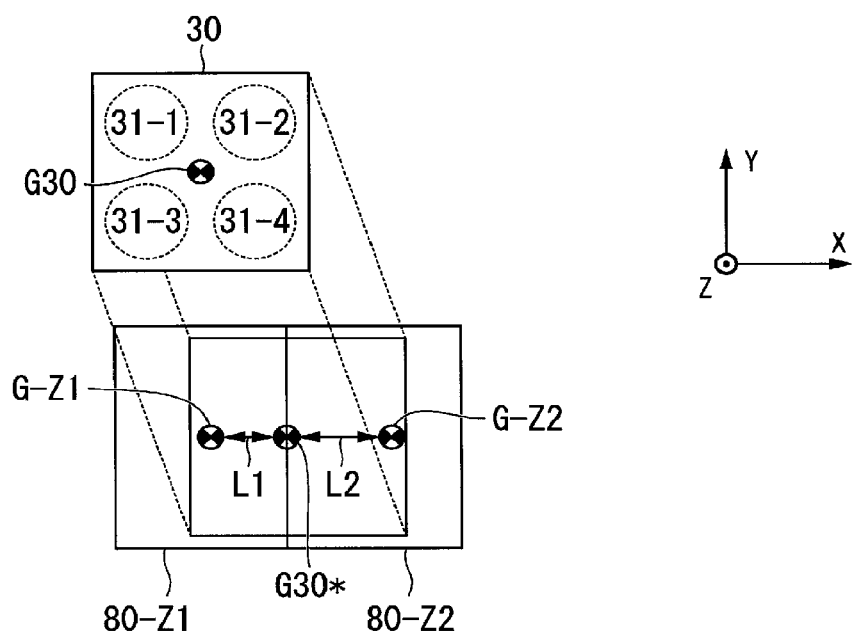
FIG. 11 is a diagram for illustrating the function 4.
Figure 12:
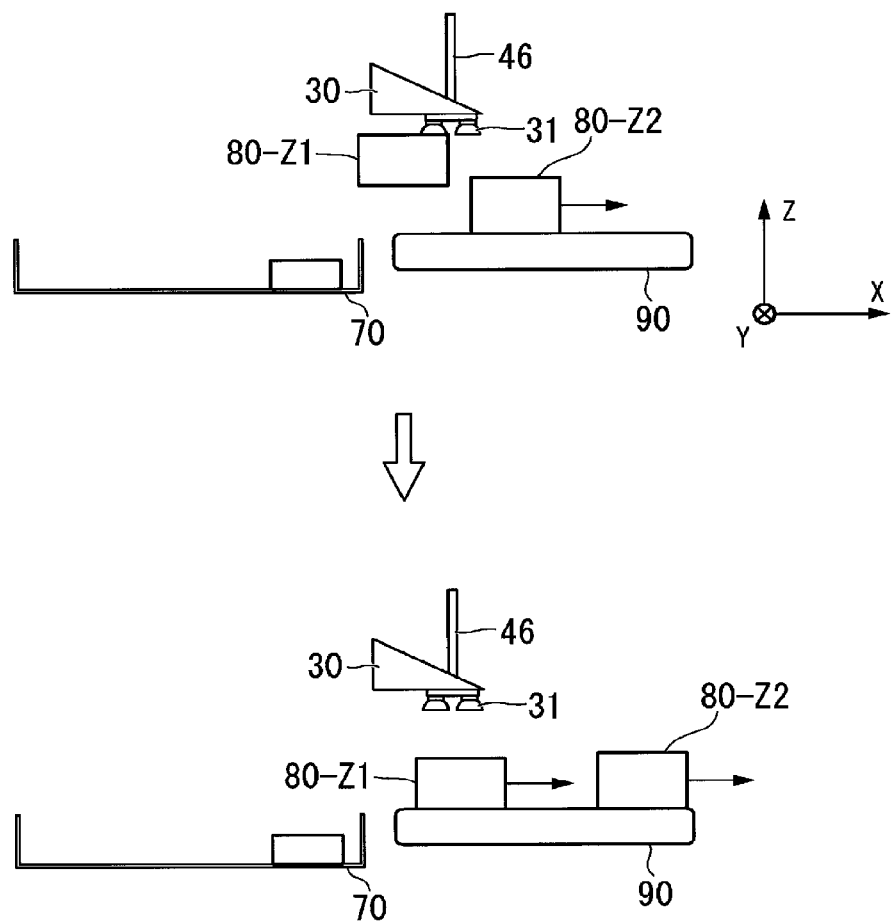
FIG. 12 is a diagram for illustrating the function 4.
Figure 13:
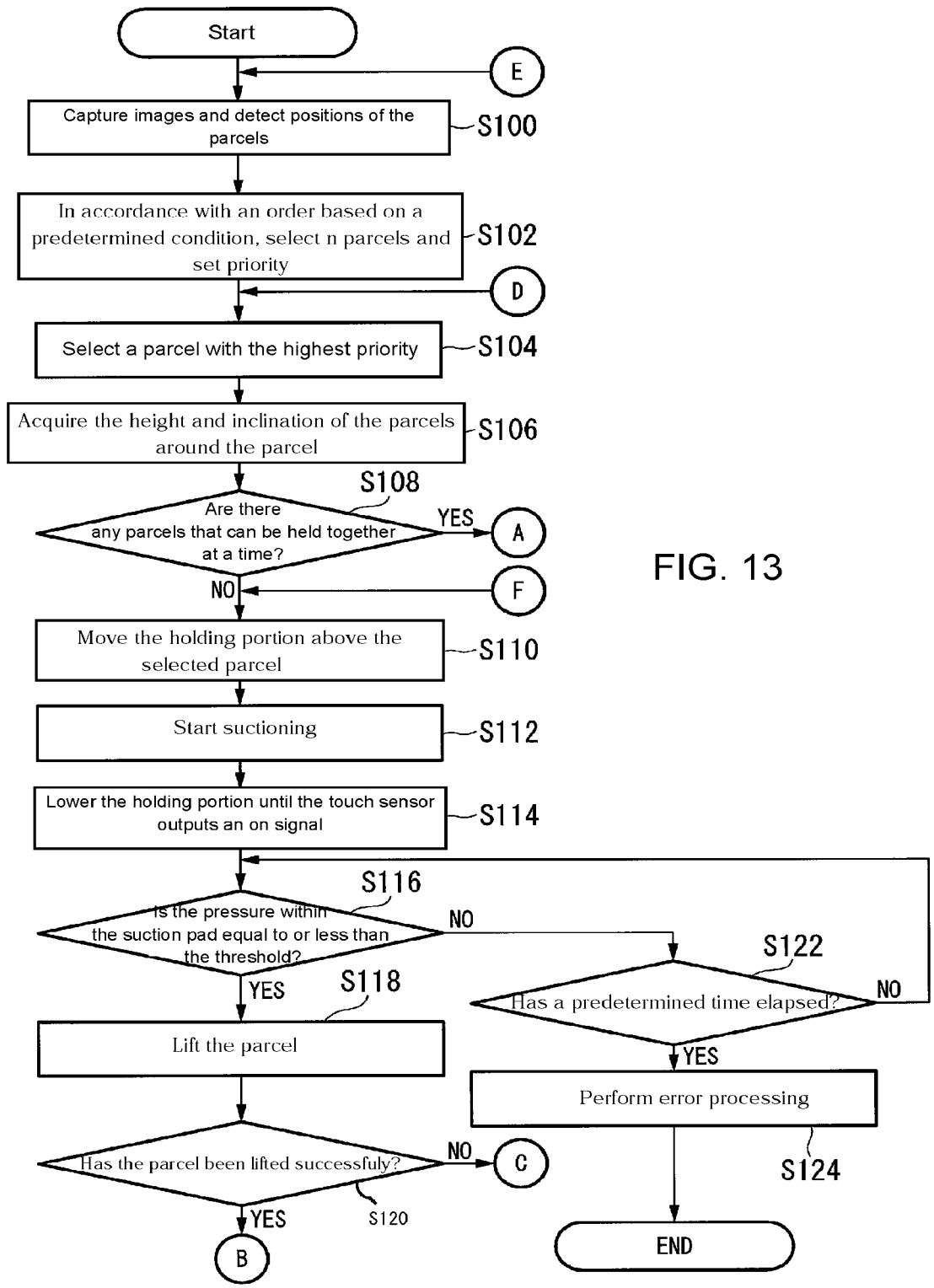
FIG. 13 is a flowchart illustrating an example flow of processing performed by the transport device 1.

FIGS. 10, 11, and 12 are diagrams for illustrating the function 4. Parcels 80-Z1 and 80-Z2 shown in FIG. 10 have their upper faces with similar heights, and are placed substantially adjacent to each other in the XY direction in the container 70, and accordingly, there is a possibility that the holding portion 30 can lift the parcels 80-Z1 and 80-Z2 together.

For this reason, if both a condition that the difference in the height of the upper face is smaller than or equal to a first specific value and a condition regarding the XY direction are satisfied, the comprehensive control portion 52 controls the arm driving portion 22 and the electromagnetic valve 44 to lift two or more parcels 80 at a time. The first specific value is, for example, a value close to the value of the distance by which the bellows structure at the leading end of each suction pad 31 contracts substantially by half.

The aforementioned condition regarding the XY direction is that, referring to FIG. 11, both a distance L1 between a centroid G30*, which is a geometric centroid G30 projected below, the geometric centroid G30 being the centroid, in an XY plane, of a portion of the holding portion 30 in which the suction pads 31 are provided, and a centroid G-Z1 of a parcel 80-Z1, and a distance L2 between the centroid G30* and a centroid G-Z2 of a parcel 80-Z2 are smaller than or equal to a second specific value, for example. Thus, an inefficient situation where a parcel 80 falls as a result of an end portion of the parcel 80 being about to be lifted forcibly can be kept from occurring.

After the holding portion 30 has lifted the plurality of parcels 80 together at a time and then brought the plurality of parcels 80 to be above the belt conveyor 90, the arm driving portion 22 and the electromagnetic valve 44 are controlled to set a different timing of release for each of the plurality of parcels 80. As shown in FIG. 12, the parcels 80-Z1 and 80-Z2 that have been transported to be above the belt conveyor 90 are controlled such that the parcel 80-Z2 is first released, and then the parcel 80-Z1 is released at a different timing. Thus, for example, an inconvenient situation where a plurality of parcels 80 overlap each other due to these parcels 80 being released at a time can be kept from occurring.

Due to the function 4, the transport device 1 can lift, at a time, a plurality of parcels 80 that can be lifted together, to transport the parcels 80 onto the belt conveyor 90. Thus, an efficient operation can be performed.

Also, the transport device 1 can keep an inconvenient situation where a plurality of parcels 80 overlap each other from occurring, by setting a different timing of release for each of the plurality of parcels 80.

Note that, although the function 1 may compete with the function 4, if both functions are provided, a rule may be defined as appropriate: for example, when the conditions regarding the function 4 are satisfied, the function 1 may be given priority if the upper face of one of a plurality of parcels 80 is not horizontal, and the function 4 may be given priority if the upper faces of both parcels 80 are substantially horizontal.

Processing Flow

FIGS. 13 to 16 are flowcharts illustrating example flows of processing performed by the transport device 1. Initially, the comprehensive control portion 52 causes the measurement unit 10 to capture images, and also causes the position detection processing device 12 to perform parcel position detection (step S100).

Next, the comprehensive control portion 52 selects n parcels 80 in accordance with a predetermined condition, and sets priority (step S102). In the following description, a group of n parcels 80 that are selected in step S102 and are taken out in order or excluded in accordance with the progress of processing will be referred to as a "selected parcel group".

Next, the comprehensive control portion 52 selects a parcel 80 with the highest priority out of parcels in the selected parcel group that remains (i.e. that have not been taken out or excluded) at this point in time (step S104), and acquires the height and inclination of the upper faces of parcels 80 that are present around the parcel 80 selected in step S104 (step S106). Then, the comprehensive control portion 52 determines whether or not there are a plurality of parcels 80 that can be held together with the parcel 80 selected in step S104 at a time (step S108).

If there are not a plurality of parcels that can be held together at a time, the comprehensive control portion 52 moves the holding portion 30 be above the parcel 80 selected in step S104 (step S110), causes the pump 40 to start suctioning (step S112), and lowers the holding portion 30 until the touch sensors 32 output an on signal (step S114). Note that, processing in step S114 may be to lower the holding portion 30 until all of the touch sensors 32 output an on signal, or may be to lower the holding portion 30 until at least one of the touch sensors 32 outputs an on signal, or may be to lower the holding portion 30 until a predetermined number of touch sensors 32 outputs an on signal.

Next, the abnormality monitoring portion 58 refers to the results of detection performed by the pressure sensors 33, and determines whether or not the pressure within at least one of the suction pads 31 has become smaller than or equal to the threshold (step S116). If the pressure within at least one of the suction pads 31 has become smaller than or equal to the threshold, the comprehensive control portion 52 lifts the parcel 80 using the robot arm 20 and the holding portion 30 (step S118). Then, the comprehensive control portion 52 determines whether or not the parcel 80 has been lifted successfully (step S120). Whether or not the parcel 80 has been lifted successfully can be determined based on whether or not the pressure within at least one of the suction pads 31 has been kept at the threshold or smaller.

Figure 14:
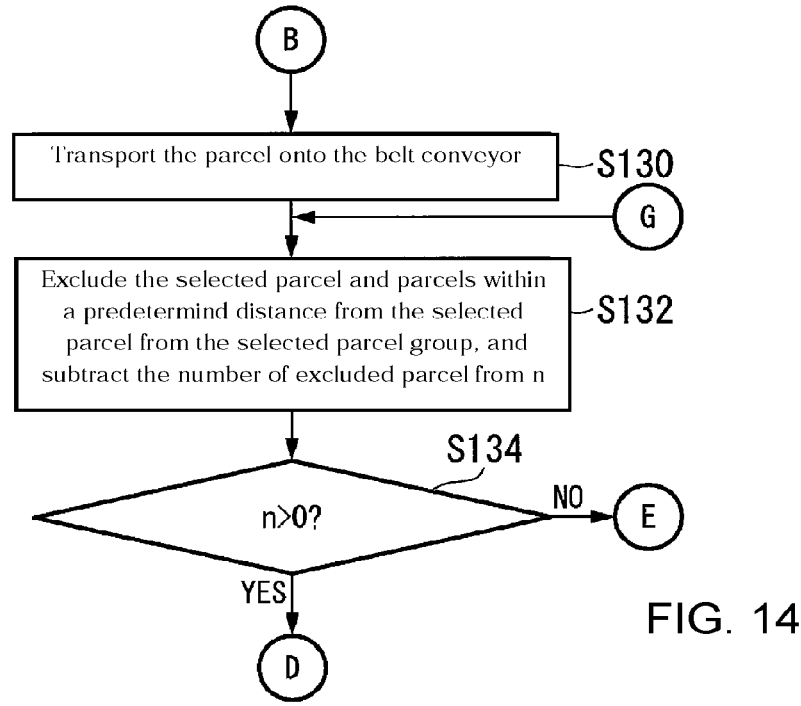
FIG. 14 is a flowchart illustrating an example flow of processing performed by the transport device 1.
Figure 15:
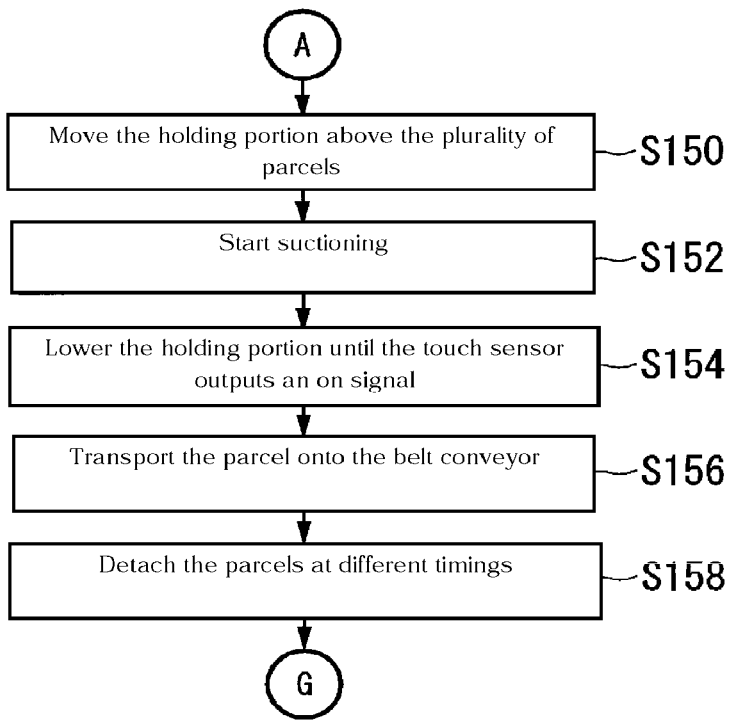
FIG. 15 is a flowchart illustrating an example flow of processing performed by the transport device 1.
Figure 16:
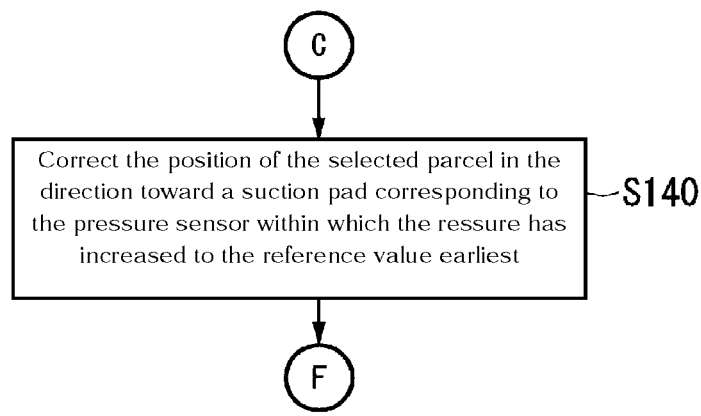
FIG. 16 is a flowchart illustrating an example flow of processing performed by the transport device 1.

If the parcel 80 has been lifted successfully, the comprehensive control portion 52 transports the parcel 80 onto the belt conveyor 90 using the robot arm 20 and the holding portion 30 (FIG. 14: step S130). Then, the parcel 80 selected in step S104 (or the parcel 80 selected in step S104 and a parcel 80 that can be lifted together with the selected parcel 80 according to the determination) and parcels 80 that are present within a predetermined distance from the parcel 80 selected in step S104 are excluded from the selected parcel group, and the number of excluded parcels is subtracted from n (step S132). In the example in FIGS. 5 and 6, if, for example, n=3, parcels 80-1, 80-2, and 80-3 have been selected as the selected parcel group, and the parcel 80-1 has been transported onto the belt conveyor 90, two parcels, namely the parcels 80-1 and 80-2 are excluded from the selected parcel group in step S132, and n is changed from 3 to 1.

Next, the comprehensive control portion 52 determines whether or not the value n is a positive value (i.e. whether or not any parcel 80 that has not been transported remains in the selected parcel group) (step S134). If the value n is a positive value, the comprehensive control portion 52 returns processing to step S104, and if not, the comprehensive control portion 52 returns processing to step S100.

Returning to FIG. 13, if it is determined in step S116 that the pressure within none of the suction pads 31 has become smaller than or equal to the threshold, the abnormality monitoring portion 58 determines whether or not a predetermined time has elapsed since processing in step S114 ended (step S122). If the predetermined time has not elapsed since processing in step S114 ended, the abnormality monitoring portion 58 returns processing to step S116. On the other hand, if the predetermined time has elapsed since processing in step S114 ended, the abnormality monitoring portion 58 performs error processing (step S124), and ends processing for one routine of this flowchart. In this case, the operator of the transport device 1 manually brings a parcel that has caused a problem onto the belt conveyor 90, then resumes the operation, and thus, processing is resumed from step S100, for example.

If it is determined in step S120 that the parcel 80 has not been lifted successfully, the comprehensive control portion corrects the position of the parcel 80 selected in step S104 in the direction toward a suction pad 31 corresponding to the pressure sensor 33 within which the pressure has increased to the reference value earliest (FIG. 16: step S140), and returns processing to step S110. Thus, the position to which the holding portion 30 is moved is corrected.

If it is determined in step S108 that parcels 80 that can be held at a time is present, the comprehensive control portion 52 moves the holding portion 30 to be above the plurality of parcels 80, including the parcel 80 selected in step S104 and the parcel 80 that can be held together with the selected parcel 80 (FIG. 15: step S150), causes the pump 40 to start suctioning (step S152), and lowers the holding portion 30 until the touch sensors 32 output an on signal (step S154). Then, the parcels 80 are transported onto the belt conveyor 90 by the robot arm 20 and the holding portion 30 (step S156), and the parcels 80 are detached from the holding portion 30 at different timings (step S158). The comprehensive control portion 52 then advances processing to step S132.

The functions 1 to 4 are realized through the above-described processing. Note that the transport device 1 need not necessarily include all of the functions 1 to 4, and for example, if the transport device 1 does not include the function 4, processing in step S108 and steps S150 to S158 in the flowcharts in FIGS. 13 to 16 can be omitted. The same applies to the other functions.

According to at least one above-described embodiment, a transport device includes: a position detection portion (10, 12) for detecting a position of a parcel (80), the position detection portion (10, 12) including a sensor provided above an accumulation portion (70) for parcels; a holding portion (30) for holding a parcel, the holding portion (30) being attached to an arm (20); a driving portion (22, 40, 42, 44) for driving the holding portion and the arm; and a control portion (50) for performing, as one cycle, a procedure to detect a position using the position detection portion, select parcels based on a predetermined condition, and set priority for the selected parcels, and a procedure to refer to a result of the detection performed by the position detection portion and cause the holding portion to take out one or more parcels from the accumulation portion in accordance with the priority to transport the one or more parcels to a predetermined location (90), and for excluding, from parcels to be taken out, a second parcel that is present within a predetermined distance from a first parcel and whose priority is lower than that of the first parcel, during the one cycle. With this configuration, parcels can be taken out accurately.

Also, according to at least one embodiment, a transport device includes: a position detection portion (10, 12) for detecting a position of a parcel (80) accumulated in an accumulation portion (70); a holding portion (30) for holding a parcel by suctioning the parcel by means of a negative pressure, the holding portion (30) being attached to an arm (20); a touch detection portion (32) for detecting that a leading end portion of the holding portion has touched a parcel; a pressure detection portion (33) for detecting a pressure within the holding portion; a driving portion (22, 40, 42, 44) for driving the holding portion and the arm; and a control portion (50) for referencing a result of the detection performed by the position detection portion, causing the holding portion to take out a parcel from the accumulation portion to transport the parcel to a predetermined location (90), and performing error processing if the pressure detected by the pressure detection portion does not fall below a threshold in a predetermined time after a touch has been detected by the touch detection portion. With this configuration, operations can be continued smoothly.

Also, according to at least one embodiment, a transport device includes: a position detection portion (10, 12) for detecting a position of a parcel (80) accumulated in an accumulation portion (70); a holding portion (30) for holding a parcel by suctioning the parcel by means of a negative pressure using a plurality of suctioning portions (31), the holding portion (30) being attached to an arm (20); a pressure detection portion (33) for detecting a pressure within each of the plurality of suctioning portions; a driving portion (22, 40, 42, 44) for driving the holding portion and the arm; and a control portion (50) for referencing a result of the detection performed by the position detection portion, controlling the driving portion to cause the holding portion to take out a parcel from the accumulation portion to transport the parcel to a predetermined location, and referencing a result of the detection performed by the pressure detection portion if, after the holding portion has lifted the parcel, the parcel falls from the holding portion, and controlling the driving portion to move the holding portion toward a suctioning portion within which the pressure has increased early, and to cause the holding portion to again lift the parcel. With this configuration, the possibility of a situation where parcels 80 cannot be taken out can be reduced.

Also, according to at least one embodiment, a transport device includes: a position detection portion (10, 12) for detecting a position of a parcel (80) accumulated in an accumulation portion (70); a holding portion (30) for holding a parcel by suctioning the parcel by means of a negative pressure using a plurality of suctioning portions (31), the holding portion (30) being attached to an arm (20); a driving portion (22, 40, 42, 44) for driving the holding portion and the arm; and a control portion (50) for referencing a result of the detection performed by the detection portion, controlling the driving portion to cause the holding portion to take out a parcel from the accumulation portion to transport the parcel to a predetermined location, and if there are a plurality of parcels that can be held at a time by the holding portion, controlling the driving portion to cause the holding portion to hold the plurality of parcels at a time. With this configuration, an efficient operation can be performed.

The embodiment can be expressed as follows.

(1) A method for controlling a transport device that includes: a position detection portion for detecting a position of a parcel, the position detection portion including a sensor provided above an accumulation portion for parcels; a holding portion for holding a parcel, the holding portion being attached to an arm; and a driving portion for driving the holding portion and the arm, the method including:

controlling the position detection portion and the driving portion to perform, as one cycle, a procedure to detect a position of a parcel using the position detection portion, select parcels based on a predetermined condition, and set priority for the selected parcels, and a procedure to refer to a result of the detection performed by the position detection portion, and cause the holding portion to take out one or more parcels from the accumulation portion in accordance with the priority to transport the parcels to a predetermined location; and excluding, from parcels to be taken out, a second parcel that is present within a predetermined distance from a first parcel and has priority lower than the priority of the first parcel, during the one cycle, by a control computer of the transport device.

(2) A method for controlling a transport device that includes; a position detection portion for detecting a position of a parcel accumulated in an accumulation portion; a holding portion for holding a parcel by suctioning the parcel by means of a negative pressure, the holding portion being attached to an arm; a touch detection portion for detecting that a leading end portion of the holding portion has touched a parcel; a pressure detection portion for detecting a pressure within the holding portion; and a driving portion for driving the holding portion and the arm, the method including;

referencing a result of the detection performed by the position detection portion, and controlling the driving portion to cause the holding portion to take out a parcel from the accumulation portion to transport the parcel to a predetermined location; and performing error processing if, after a touch is detected by the touch detection portion, the pressure detected by the pressure detection portion does not become smaller than a threshold in a predetermined time, by a control computer of the transport device.

(3) A method for controlling a transport device that includes; a position detection portion for detecting a position of a parcel accumulated in an accumulation portion; a holding portion for holding a parcel by suctioning the parcel by means of a negative pressure using a plurality of suctioning portions, the holding portion being attached to an arm; a pressure detection portion for detecting a pressure within each of the plurality of suctioning portions; and a driving portion for driving the holding portion and the arm, the method including:

referencing a result of the detection performed by the position detection portion, and controlling the driving portion to cause the holding portion to take out a parcel from the accumulation portion to transport the parcel to a predetermined location; and if, after the holding portion has lifted a parcel, the parcel falls from the holding portion, referencing a result of the detection performed by the pressure detection portion, and controlling the driving portion to move the holding portion toward a suctioning portion within which the pressure has increased earlier, and to cause the holding portion to again lift the parcel, by a control computer of the transport device.

(4) A method for controlling a transport device that includes: a position detection portion for detecting a position of a parcel accumulated in an accumulation portion; a holding portion for holding a parcel by suctioning the parcel by means of a negative pressure using a plurality of suctioning portions, the holding portion being attached to an arm; and a driving portion for driving the holding portion and the arm, the method including:

referencing a result of the detection performed by the position detection portion, and controlling the driving portion to cause the holding portion to take out a parcel from the accumulation portion to transport the parcel to a predetermined location; and if there are a plurality of parcels that can be held at a time by the holding portion, causing the holding portion to hold the plurality of parcels at a time, by a control computer of the transfer device (5) A program for causing a control computer of a transport device that includes: a position detection portion for detecting a position of a parcel, the position detection portion including a sensor provided above an accumulation portion for parcels; a holding portion for holding a parcel, the holding portion being attached to an arm; and a driving portion for driving the holding portion and the arm, to control the position detection portion and the driving portion to perform, as one cycle, a procedure to detect a position of a parcel using the position detection portion, select parcels based on a predetermined condition, and set priority for the selected parcels, and a procedure to refer to a result of the detection performed by the position detection portion, and cause the holding portion to take out one or more parcels from the accumulation portion in accordance with the priority to transport the parcels to a predetermined location, and exclude, from parcels to be taken out, a second parcel that is present within a predetermined distance from a first parcel and has priority lower than the priority of the first parcel, during the one cycle.

(6) A program for causing a control computer of a transport device that includes: a position detection portion for detecting a position of a parcel accumulated in an accumulation portion; a holding portion for holding a parcel by suctioning the parcel by means of a negative pressure, the holding portion being attached to an arm; a touch detection portion for detecting that a leading end portion of the holding portion has touched a parcel; a pressure detection portion for detecting a pressure within the holding portion; and a driving portion for driving the holding portion and the arm, to refer to a result of the detection performed by the position detection portion, and control the driving portion to cause the holding portion to take out a parcel from the accumulation portion to transport the parcel to a predetermined location; and perform error processing if, after a touch is detected by the touch detection portion, the pressure detected by the pressure detection portion does not become smaller than a threshold in a predetermined time.

(7) A program for causing a control computer of a transport device that includes: a position detection portion for detecting a position of a parcel accumulated in an accumulation portion; a holding portion for holding a parcel by suctioning the parcel by means of a negative pressure using a plurality of suctioning portions, the holding portion being attached to an arm; a pressure detection portion for detecting a pressure within each of the plurality of suctioning portions; and a driving portion for driving the holding portion and the arm, to refer to a result of the detection performed by the position detection portion, and control the driving portion to cause the holding portion to take out a parcel from the accumulation portion to transport the parcel to a predetermined location; and if, after the holding portion has lifted a parcel, the parcel falls from the holding portion, refer to a result of the detection performed by the pressure detection portion, and control the driving portion to move the holding portion toward a suctioning portion within which the pressure has increased earlier than within another suctioning portion, and to cause the holding portion to again lift the parcel.

(8) A program for causing a control computer of a transport device that includes: a position detection portion for detecting a position of a parcel accumulated in an accumulation portion; a holding portion for holding a parcel by suctioning the parcel by means of a negative pressure using a plurality of suctioning portions, the holding portion being attached to an arm; and a driving portion for driving the holding portion and the arm, to refer to a result of the detection performed by the position detection portion, and control the driving portion to cause the holding portion to take out a parcel from the accumulation portion to transport the parcel to a predetermined location; and if there are a plurality of parcels that can be held at a time by the holding portion, cause the holding portion to hold the plurality of parcels at a time.

Although some embodiments of the present invention have been described, these embodiments are presented as examples and are not intended to limit the scope of the invention. These embodiments can be implemented in any other various modes, and can be omitted, replaced, or modified in various manners without departing from the gist of the invention. These embodiments and modifications thereof are encompassed in the scope and the gist of the invention, and are also encompassed within the invention described in the claims and the equivalents thereof.

What is claimed is:

1. A transport device comprising:
a position detection portion for detecting a position of a parcel, the position detection portion including a sensor provided above an accumulation portion for parcels;
a holding portion for holding a parcel, the holding portion being attached to an arm;
a driving portion for driving the holding portion and the arm; and
a control portion for controlling the position detection portion and the driving portion to perform, as one cycle, a procedure to detect a position of a parcel using the position detection portion, select parcels and set priority indicating an order of taking out the selected parcels based on a predetermined condition, and a procedure to refer to a result of the detection performed by the position detection portion, and cause the holding portion to take out one or more parcels from the accumulation portion in accordance with the priority to transport the parcels to a predetermined location, and for excluding, from parcels to be taken out, a second parcel that is present within a predetermined distance from a first parcel and has priority lower than the priority of the first parcel, during the one cycle, and for controlling the position detection portion and the driving portion to perform a new cycle again if a parcel having the set priority is not present after exclusion.

2. The transport device according to claim 1,
wherein the predetermined distance is determined based on a largest size of parcels that are to be handled by the transport device.

3. The transport device according to claim 1,
wherein the control portion selects a predetermined number of parcels that do not overlap each other as viewed from above by the holding portion, in descending order of a height of an upper end position of each parcel, and sets the priority for the selected parcels in descending order of the height of the upper end position.

4. The transport device according to claim 1, further comprising:
a touch detection portion for detecting that a leading end portion of the holding portion has touched a parcel; and
a pressure detection portion for detecting a pressure within the holding portion,
wherein the holding portion has a suctioning portion for suctioning a parcel by means of a negative pressure, and
the control portion performs error processing if, after it is detected by the touch detection portion that the leading end portion of the holding portion has touched a parcel, the pressure detected by the pressure detection portion does not become smaller than a threshold in a predetermined time.

5. The transport device according to claim 4, further comprising:
an output portion for outputting information,
wherein the error processing is processing to cause the output portion to output information indicating that an error has occurred.

6. The transport device according to claim 1,
wherein the holding portion has a plurality of suctioning portions for suctioning a parcel by means of a negative pressure,
the transport device further comprises a pressure detection portion for detecting a pressure within each of the plurality of suctioning portions, and
if, after the holding portion has lifted a parcel, the parcel falls from the holding portion, the control portion refers to a result of the detection performed by the pressure detection portion, and controls the driving portion to move the holding portion toward a suctioning portion within which the pressure has increased earlier than within another suctioning portion, and to cause the holding portion to again lift the parcel.

7. The transport device according to claim 1,
wherein the holding portion has a plurality of suctioning portions for suctioning a parcel by means of a negative pressure, and
if there are a plurality of parcels that can be held at a time by the holding portion, the control portion causes the holding portion to hold the plurality of parcels at a time.

8. The transport device according to claim 7,
wherein the driving portion can individually control pressures within the plurality of suctioning portions, and
if the control portion causes the holding portion to hold the plurality of parcels at a time, the control portion controls the driving portion to set a different timing of release for each of the plurality of parcels at the predetermined location.

9. A transport method comprising:
detecting a position of a parcel, by using a position detection portion including a sensor provided above an accumulation portion for parcels;
holding a parcel by a holding portion attached to an arm;
driving the holding portion and the arm; and
controlling the position detection portion and the driving to perform, as one cycle, a procedure to detect a position of a parcel using the position detection portion, select parcels and set priority indicating an order of taking out the selected parcels based on a predetermined condition, and a procedure to refer to a result of the detection performed by the position detection portion, and cause the holding portion to take out one or more parcels from the accumulation portion in accordance with the priority to transport the parcels to a predetermined location, and for excluding, from parcels to be taken out, a second parcel that is present within a predetermined distance from a first parcel and has priority lower than the priority of the first parcel, during the one cycle, and for controlling the position detection portion and the driving portion to perform a new cycle again if a parcel having the set priority is not present after exclusion.

10. The transport method according to claim 9,
wherein the predetermined distance is determined based on a largest size of parcels that are to be handled by the transport device.

11. The transport method according to claim 9,
wherein the controlling selects a predetermined number of parcels that do not overlap each other as viewed from above by the holding portion, in descending order of a height of an upper end position of each parcel, and sets the priority for the selected parcels in descending order of the height of the upper end position.

12. The transport method according to claim 9, further comprising:
detecting by a touch detection portion that a leading end portion of the holding portion has touched a parcel; and
detecting, by a pressure detection portion, a pressure within the holding portion,
wherein the holding portion has a suctioning portion for suctioning a parcel by a negative pressure, and
the controlling performs error processing if, after it is detected by the touch detection portion that the leading end portion of the holding portion has touched a parcel, the pressure detected by the pressure detection portion does not become smaller than a threshold in a predetermined time.

13. The transport method according to claim 12, further comprising:
outputting information by an output portion,
wherein the error processing is processing to cause the output portion to output information indicating that an error has occurred.

14. The transport method according to claim 9,
wherein the holding portion has a plurality of suctioning portions for suctioning a parcel by means of a negative pressure,
and further comprising detecting a pressure by a pressure detection portion for within each of the plurality of suctioning portions, and
if, after the holding portion has lifted a parcel, the parcel falls from the holding portion, the controlling refers to a result of the detection performed by the pressure detection portion, and controls the driving to move the holding portion toward a suctioning portion within which the pressure has increased earlier than within another suctioning portion, and to cause the holding portion to again lift the parcel.

15. The transport method according to claim 9,
wherein the holding portion has a plurality of suctioning portions for suctioning a parcel by means of a negative pressure, and
if there are a plurality of parcels that can be held at a time by the holding portion, the controlling causes the holding portion to hold the plurality of parcels at a time.

* * * * *